UNITED STATES PATENT OFFICE 2,471,772

PRODUCTION OF SULFONAMIDES

Siegfried Pickholz, Liverpool, and Haydn Geoffrey Dickenson, Warrington, England, assignors to Ward, Bienkinsop & Company Limited, Brooklands, Halewood, Liverpool, England No Drawing. Application June 26, 1945, Serial No. 601,717. In Great Britain June 7, 1944

Section 1, Public Law 690, August 8, 1946.
Patent expires June 7, 1964

10 Claims. (Cl. 260—239.6)

This invention relates to the production of sulphonamide derivatives of heterocyclic compounds containing a nuclear nitrogen atom.

Heretofore such sulphonamides have been prepared by two general methods. In the first of these methods a sulphonic acid halide has been caused to react with a compound having an amino or imino group present as a substituent in the heterocyclic nucleus. In the second method a sulphonamide has been reacted with a compound having a halogen atom present as a substituent in the heterocyclic nucleus.

It has now been found that these sulphonamide compounds can readily be prepared by heating together a sulphonamide and a thioether of a heterocyclic compound containing a nuclear nitrogen atom.

The process according to the present invention for the production of a sulphonamide derivative comprises heating together in the liquid phase a sulphonamide containing at least one free hydrogen atom in the sulphonamide grouping and a thioether of the general formula $$R^2SR^3$$

in which $R^2$ is selected from the group consisting of alkyl and aralkyl groups and $R^3$ is a heterocyclic group containing a nuclear nitrogen atom. It appears that the reaction involved can be represented as follows:

$$R.SO_2.NHR^1 + R^2SR^3 \rightarrow R.SO_2.NR^1R^3 + R^2SH$$

in which R is the residue of the sulphonamide employed and $R^1$ is hydrogen or a substituent i. e. an alkyl, aryl, aralkyl, acyl or heterocyclic group. It will be appreciated that the residue R takes no part in the reaction.

According to a feature of the invention the reaction may be carried out in the presence of a basic metal oxide or hydroxide or of a salt thereof with an acid which is capable of being replaced, under the conditions of the reaction, by a sulphonamido group, particularly those of the metals of Groups Ia, IIa and IVb of the Periodic Table of Mendeleef, or in the presence of a strong organic base. Examples of such basic metal oxides and hydroxides are sodium and potassium hydroxides, magnesium oxide and barium hydroxide. Examples of such salts are sodium, potassium and lead carbonates and acetates, all of which, it will be appreciated, are salts of weak or easily displaced acids. Examples of strong organic bases are triethanolamine, trimethylamine and sodium ethoxide. Sulphonamides are known to form derivatives of salt-forming cations, especially at raised temperatures, and the introduction of the aforementioned bodies is believed to result in the transient formation of such derivatives in situ. The preformed metal derivatives, such as the sodium, potassium or lead derivatives, may themselves be used in carrying out the reaction.

The secondary product which is formed together with the sulphonamide is a mercaptan and in accordance with a further feature of the invention the groups $R^2$ and $R^3$ are preferably so chosen that the mercaptan obtained or the sulphonamide produced is progressively removed from the liquid phase in which the reaction is occurring.

Since it is necessary to heat the reactants in order to initiate the reaction the group $R^2$ may be so chosen that the mercaptan produced normally exists in the vapour phase at the temperature and pressure at which the reaction takes place. The mercaptan is then evolved as it is formed and so can readily be removed from the vessel in which the reaction is taking place. For this purpose it is preferred that the group $R^2$ is an alkyl group containing not more than six carbon atoms and it is preferably a methyl, ethyl, propyl or isopropyl group. The use of such alkyl thioethers of heterocyclic compounds containing a nitrogen atom is of advantage in that, not only does the formation of the mercaptan, volatile at the pressure at which the reaction is carried out, as the other primary reaction product enable the reaction to proceed more readily and more nearly to completion, but the absence of the mercaptan from the reaction product renders the purification of the resulting sulphonamide more easily to accomplish.

Mercaptans volatile at atmospheric pressure under the reaction conditions are only formed when the group $R^2$ is an alkyl group containing a small number of carbon atoms. However, the group $R^2$ may be an aralkyl group such as benzyl. In such cases the mercaptan formed is directly isolated from the reaction product or may be removed periodically, or at the end of the reaction, under reduced pressure.

The sulphonamide used may be an unsubstituted sulphonamide having the general formula $R.SO_2.NH_2$, for example, benzene sulphonamide or p-toluene sulphonamide or a mono-substituted sulphonamide of the general formula $R.SO_2NHR^1$ in which $R^1$ is an alkyl, aryl, acyl, aralkyl or heterocyclic group. Thus there may be used a mono-alkyl sulphonamide such as an N-methyl- or N-ethyl-sulphonamide, or a mono-acyl sulphonamide such as a sulphon acetamide or a sulphon propionamide. When the group $R^1$ is a heterocyclic group the process of the invention may be used to produce a sulphonamide derivative in which each of the hydrogen atoms of the group $-SO_2.NH_2$ has been replaced by a heterocyclic group and such heterocyclic groups may be like or unlike in character, for example, one may be a thiazole group and the other a pyrimidine group.

The process according to the invention may be carried out in the presence of a suitable high-boiling solvent, such as phenol, the alkylated phenols and the naphthols or mixtures thereof.

As previously indicated the group $R^3$ is a heterocyclic group containing a nuclear nitrogen atom. It has been found that the process according to the invention may be conveniently used for the production of the benzene sulphonamide derivatives which are useful in combating bacterial infections. Thus the group $R^3$ may be a pyridine, diazine (e. g. a pyrimidine), thiazole, thiazoline or oxazole group and this may or may not contain substituents e. g. the group $R^3$ may be a benzthiazole, a nitropyridine, a 4-alkyl-pyrimidine, a 4- or 6-oxypyrimidine, a 4-halo-pyrimidine, a 4-alkoxypyrimidine, a 4-aryl-pyrimidine or a 4-amino-pyrimidine group. In the production of such compounds a sulphonamide is used in which the group R is a phenyl group which contains as a substituent in the para position, a free amino group, a protected amino group, i. e. an acylamino or an alkylamino group or a group which is readily convertible to an amino group i. e. a nitro or azo group or a halogen atom.

When a benzene sulphonamide is used containing as a para substituent in the said benzene nucleus a group which is readily convertible to an amino group the invention includes the additional steps necessary to convert such group into an amino group. Thus a nitro or azo group may be reduced with nascent hydrogen under acid conditions to an amino group. A sulphonamide containing a halogen substituent in the benzene ring may be heated with aqueous ammonia under pressure to introduce an amino group. An acylamino group is readily hydrolysed by heating with aqueous mineral acid for a short time.

The present invention is interesting in that it provides a method for directly preparing benzene sulphonamides which contain a free amino substituent in the benzene ring. Thus sulphanilamide or a metal derivatives thereof can be heated with the thioether and the desired reaction product can be readily isolated from the cooled reaction mixture. The reaction proceeds equally well with a benzene sulphonamide containing a protected amino group. Not only is the reaction applicable to benzene sulphonamides containing free amino groups, protected amino groups and groups readily convertible to amino groups but also to those containing other substituents such as a cyano group which may or may not be present in the para position in the benzene ring so long as these substituents are of such a character that they can withstand the reaction conditions.

Examples of thioethers which may be used in accordance with the invention are 2-(methylmercapto)-pyrimidine, 2-(methylmercapto)-4 methyl-pyrimidine, 2-(methylmercapto)-4 methyl-6-oxypyrimidine, 2-(methylmercapto)-6-oxypyrimidine, 2-(methylmercapto)-4-chloropyrimidine, 2-(methylmercapto)-6-chloro-pyrimidine, 2-(methylmercapto)-4.5-dimethyl-6-oxypyrimidine, 2-(methylmercapto)-4-amino-6-oxypyrimidine, 2-(methylmercapto)-4-methyl-6-thio-pyrimidine, 2.4-dimethyl-6-(methylmercapto)-pyrimidine, 2-(methylmercapto)-benzthiazole, and 2-(methylmercapto)-5-nitropyridine. Instead of the 2-(methylmercapto) compounds there may be used the corresponding 2-(ethylmercapto)-, 2-(isopropylmercapto)-, 2-(n-propylmercapto)-, 2-(isobutylmercapto)-, 2-(n-butylmercapto)- and 2-(isoamylmercapto)- compounds such as 2-(ethylmercapto)-pyrimidine, 2-(ethylmercapto)-4-ethoxy-pyrimidine, 2-(ethylmercapto)-4-methyl-pyrimidine, 2-ethylmercapto)-4-phenyl-pyrimidine, 2-(n-propylmercapto)-6-oxy-pyrimidine and 2-(n-butylmercapto)-6-oxy-pyrimidine. It will be appreciated that all these thioethers when used in the process according to the invention result in the production of a volatile mercaptan which can be removed from the reaction vessel as it is formed.

The thioethers which are used as starting materials in the process of the invention may, for example be obtained by the interaction of an alkali metal derivative of a mercaptan with a halogen derivative of the heterocyclic compound containing a nuclear nitrogen atom. Thus a sodium or potassium alkyl sulphide is treated with the appropriate heterocyclic compound having a halogen atom as a substituent in the position in which it is desired to introduce the alkyl- or aralkyl-mercapto grouping. In the case of a pyrimidine thioether this may be made from an S-alkyl isothiourea and an appropriately substituted diketone. According to a feature of the invention the production of the thioether may be carried out in situ either prior to or simultaneously with the production of the desired sulphonamide derivative.

The use in the process according to the invention of a thioether which forms a volatile mercaptan not only, as already noted, provides an enhanced yield of sulphonamide but the volatile mercaptan can be recovered, by condensing the volatile mercaptan as it is evolved, outside the reaction vessel, and it can then be used again in the production of further quantities of the thioether which constitutes the starting material in the process according to the invention.

The reaction is brought about by heating the sulphonamide with the thioether. A mixture of the reactants may be heated to fusion whereupon the reaction commences. Generally the reactants fuse between about 140° and 180° C. and, when they are so chosen that a volatile mercaptan is a reaction product, evolution of the volatile mercaptan begins soon after fusion has taken place. Usually the reaction mixture is heated for a period of several hours and the temperature thereof is gradually raised until it finally reaches 200° or a little higher. When a volatile mercaptan is a reaction product completion of the reaction is indicated by the substantial cessation in the evolution of mercaptan. The reaction may, in some cases, however, be brought about at a lower temperature, for example, by heating the reactants with water under reflux. After this the reaction mixture is allowed to cool whereupon it generally solidifies and is then removed from the reaction vessel and is pulverised or taken up in a suitable solvent. A small amount of a by-product is usually formed which is easily separated. After separation of this material the sulphonamide is readily isolated and purified.

The following examples illustrate the manner in which the invention may be carried into effect. All the parts are by weight.

Example 1

A mixture of 10 parts of sodium sulphanilamide and 11.5 parts of 2-(methylmercapto)-6-oxypyrimidine is heated together. The reaction mixture melts at 150–170° C. and between 170–180° C. a lively evolution of methyl mercaptan begins. When the evolution of methyl mercaptan has ceased (3–4 hours), the reaction product is cooled and dissolved in hot water. Upon acidification with acetic acid crystals are precipitated from the hot solution. These are filtered off and washed thoroughly with hot water. The product is almost pure 2-(para-aminobenzenesulphonamido)-6-oxypyrimidine.

Example 2

A mixture of 11 parts of the sodium derivative of para-acetylamino-benzene sulphonamide and 7 parts of 2-(methylmercapto)-6-oxypyrimidine in phenol (10 parts) is heated as described in Example 1. At about 140–150° a clear solution is obtained, and at 160–170° evolution of methyl mercaptan begins. In about 3 hours, during which the temperature has been gradually raised to 200–205° C., the reaction is complete. The product is allowed to cool and is dissolved in about 100 parts of hot water to give a clear, slightly alkaline solution, which on cooling is made strongly acid to Congo red paper with concentrated hydrochloric acid. A crystalline precipitate forms which is filtered off and thoroughly washed with hot water. The material so obtained is then boiled under reflux with 100 parts of methylated spirit, filtered hot, and the insoluble residue washed with hot methylated spirit. There is obtained 12 parts of 2-(para-acetylamino-benzenesulphonamido)-6-oxypyrimidine, which, when recrystallised from dilute alcohol, melts at 275–280°.

For hydrolysis 2 parts of this product is boiled under reflux for ½–1 hour with a mixture of 8 parts of concentrated hydrochloric acid, 10 parts of methylated spirit (64 O. P.) and 12 parts of water. The resulting solution is decolourised with charcoal, filtered and made slightly alkaline with ammonia, whereupon a white crystalline precipitate is formed, which is 2-(para-aminobenzenesulphonamido)-6-oxypyrimidine, identical with the product obtained in Example 1 (1.5 parts, melting point 274–6°). (Free amino (by titration) 6.21% calculated 6.02%.)

Example 3

A mixture of 10 parts of sodium sulphanilamide and 12 parts of 2-(methylmercapto)-4-methyl-6-oxypyrimidine is gradually heated. The mixture melts at 150–170° C. and between 170–180° C. a lively evolution of methyl mercaptan begins. Heating is continued for 3–4 hours by the expiration of which time evolution of methyl mercaptan has substantially ceased and the temperature of the reaction mixture has risen to about 210° C. Toward the end of the period of heating the viscosity of the reaction mixture increases. The product is then allowed to cool whereupon it is broken up, powdered and introduced into a solution of caustic soda. The solution is filtered from undissolved solid material and sufficient hydrochloric acid added to the filtrate to produce a solution which is acid to Congo red. The precipitate which at first forms largely redissolves but a small insoluble residue is separated. The clear filtrate is then made slightly alkaline with aqueous ammonia. The precipitate which forms is filtered off, washed with water and boiled under reflux with methylated spirit. The insoluble material is separated by filtration, washed with hot alcohol and dried: it is 2-(para-amino-benzenesulphonamido)-4-methyl-6-oxypyrimidine. (S found 11.48%: calculated 11.43%: N found 19.9%, 19.97%: calculated 20.0%.)

Example 4

A mixture of 10 parts of the sodium salt of para-acetylamino-benzenesulphonamide and 10 parts of 2-(methylmercapto)-4-methyl-6-oxypyrimidine is heated as described in Example 3. The reaction product, after cooling, is boiled with hot water to bring it into solution. The solution is cooled and made strongly acid with hydrochloric acid and the insoluble material filtered off. The product, which is 2-(para-acetylamino-benzenesulphonamido)-4-methyl-6-oxypyrimidine can be further purified by crystallization from alcohol. This substance can be hydrolysed and the product isolated in exactly the same way as in Example 2 and in this manner 2-(para-aminobenzene-sulphonamido)-4-methyl-6-oxypyrimidine is obtained, identical with the product described in Example 3.

Example 5

A mixture of 10 parts of phenol, 12 parts of sodium sulphanilamide and 7 parts of 2-(methylmercapto)-pyrimidine is gradually heated. Evolution of methyl mercaptan commences at about 170° C. and a brisk reaction sets in. The reaction mixture is heated for 3–4 hours until the evolution of methyl mercaptan has substantially ceased and the temperature of the reaction mixture has risen to about 220° C. The product is cooled and dissolved in hot water. The aqueous solution is cooled, acidified with hydrochloric acid and extracted with ether in order to remove phenol. The remaining aqueous solution is made slightly alkaline with ammonia and the precipitate which separates filtered off. This precipitate is boiled with hot water and the insoluble material separated: it is almost pure 2-(para-aminobenzenesulphonamido)-pyrimidine.

Example 6

7.5 parts of sulphanilamide and 5 parts of 2-(methylmercapto)-6-oxypyrimidine are mixed and heated with stirring. At 170–180° the mass melts to a homogeneous fluid, and on raising the temperature slowly to 210°, methyl mercaptan is evolved. After the evolution of methyl mercaptan has substantially ceased (3 hours) the mass is allowed to cool, and dissolved in an excess of 10% sodium hydroxide solution. The cold solution is acidified with hydrochloric acid until the white precipitate which first forms has redissolved, and the solution is filtered from a small amount of insoluble material. The pH is then adjusted to neutrality with dilute sodium hydroxide and the white precipitate filtered off. The filtrate is then made faintly acid to Congo Red paper and the precipitate is collected. This is 2-(para-aminobenzenesulphonamido)-6-oxy-pyrimidine, identical with that prepared according to Example 2.

Example 7

9.3 parts of para-acetylaminobenzenesulphonamide is heated with 5 parts of 2-(methylmercapto)-6-oxypyrimidine in an oil bath to 210°; methyl mercaptan is evolved. When the reaction is complete (3-4 hours) the melt is cooled and dissolved in an excess of 10% sodium hydroxide solution. After filtration, the pH is adjusted to 6.5-7 whereupon 2-(para-acetylaminobenzenesulphonamido)-6-oxypyrimidine is precipitated. It is purified by recrystallisation from boiling water. Melting point 274-276°. The product is identical with that of Example 5.

Example 8

6.5 parts of sodium hydroxide are dissolved in 10 parts of water and 20 parts of benzene sulphonamide, and 14 parts of 2-(methylmercapto)-6-oxypyrimidine added. The mixture is gradually heated up to a final temperature of about 200° C. during five hours. Water is evaporated and then methyl mercaptan is evolved; the fused product is then allowed to cool down and dissolved in about 50 cc. of water. The solution is filtered with the aid of charcoal, diluted with water to about 200 cc. and made slightly acid with acetic acid. The solution is then cooled down and a substance crystallizes which is filtered off and recrystallised from alcohol. It is 2-(benzenesulphonamido)-6-oxypyrimidine.

Example 9

A mixture of 10 parts of the sodium salt of benzene sulphonamide and 8 parts of 2-(methylmercapto)-4-methyl-6-oxypyrimidine is gradually heated. The mixture melts at 150-170° C. and between 170-180° C. a lively evolution of methyl mercaptan begins. Heating is continued for 3-4 hours by the end of which time evolution of methyl mercaptan has substantially ceased and the temperature of the reaction mixture has risen to about 210° C. Towards the end of the period of heating the viscosity of the reaction mixture increases. The product is then allowed to cool, broken up, and added to a solution of caustic soda. The solution is filtered from undissolved solid material and sufficient hydrochloric acid added to the boiling filtrate to produce a solution which is slightly acid. The precipitate which is formed is filtered off, washed with boiling water and alcohol, and dried: it is 2-(benzene-sulphonamido)-4-methyl-6-oxypyrimidine.

Example 10

A mixture of 12 parts of sodium p-toluene sulphonamide and 7 parts of 2-(methylmercapto)-6-oxypyrimidine is heated and subsequently worked up as described in Example 3. The product is 2-(p-toluene-sulphonamido)-6-oxypyrimidine.

Example 11

A mixture of 12 parts of sodium-p-chloro-benzene sulphonamide, and 8 parts of 2-(methylmercapto)-6-oxypyrimidine is heated and worked up as described in Example 10. The product is 2-(p-chloro-benzene sulphonamido)-6-oxypyrimidine.

Example 12

A mixture of 6 parts of p-nitro-benzene sulphonamide and 5 parts of 2-(methylmercapto)-4-chloro-pyrimidine in 50 parts of water is refluxed for 4-5 hours. Evolution of methylmercaptan has substantially ceased after this time and the chloropyrimidine is completely dissolved. The hot solution is filtered with the aid of charcoal and cooled. A white product crystallises out which, after standing for some time, is filtered off, washed with water and alcohol. The product is 2-(p-nitrobenzene sulphonamido)-4-chloropyrimidine.

Example 13

A mixture of 4 parts of p-nitro-benzene sulphonamide, 3 parts of 2-(methylmercapto)-6-oxypyrimidine, 2 parts of anhydrous sodium acetate and 4 parts of phenol is gradually heated up in an oil bath. The mixture becomes liquid at about 100-110° C. Methylmercaptan is first evolved at about 140° C. The mixture is kept liquid for 4-5 hours at a temperature of 170-180° C. until the evolution of methylmercaptan slows down. The mass is then cooled and alcohol is added. The mass crystallises and is filtered off, washed with alcohol and dried. This crystalline product is dissolved in caustic soda solution, a slight amount of insoluble material is filtered off with the aid of charcoal and the alkaline liquors are made slightly acid with acetic acid. A precipitate is formed which is filtered off, washed with water and alcohol and dried. This is 2-(p-nitro-benzene-sulphonamido)-6-oxypyrimidine.

Example 14

8 parts of sodium hydroxide are dissolved in 12 parts of water, 34 parts of sulphanilamide and 20 parts of 2-(methylmercapto)-6-oxypyrimidine are added and the mixture is gradually heated up. It soon liquifies with evaporation of water, and later methyl mercaptan is evolved. The temperature is maintained at about 180-190° C. for three hours when the mixture becomes first viscous and finally solid with the cessation of the evolution of methyl mercaptan. The solid residue is treated as described in Example 1 and the product obtained is identical with that of Example 1.

Example 15

A mixture of 10 parts of the sodium salt of sulphanilamide, 4.3 parts of 2-(methylmercapto)-pyrimidine, 10 parts of β-naphthol and 1 part of sodium acetate is heated and subsequently worked up as described under Example 5. The product is identical with the product obtained in that example.

Example 16

A mixture of 11 parts of the potassium salt of sulphanilamide, 15 parts of sulphanilamide, 5 parts of phenol, and 6 parts of 2-(methylmercapto)-pyrimidine is gradually heated to 175-180° C., with occasional stirring and this temperature maintained for 10-12 hours. During this time, methyl mercaptan is evolved. The fused mixture is cooled, dissolved in water and the solution separated from an insoluble resinous residue. The liquors are made slightly acid with acetic acid, whereupon an oil separates. This oil is combined with the resin, and alcohol added; a dark solution is obtained, from which a product crystallises after standing for some hours. This product is filtered off, washed with alcohol, and boiled with water; an insoluble material remains which is filtered off. The insoluble material is dissolved in caustic soda solution, the solution filtered with the aid of charcoal and the liquors made slightly acid with hydrochloric acid. A white substance crystallises out. It is filtered off, washed with hot water and alcohol and dried. It is almost pure 2-(p-amino-benzene-sulphonamido)-pyrimidine.

*Example 17*

A mixture of the lead salt of sulphanilamide (from 14 parts of sulphanilamide and 26 parts of lead acetate crystals), 10 parts of 2-(methylmercapto)-4-methyl-6-oxypyrimidine and 20 parts of phenol is gradually heated to 200–210° during three hours, with occasional stirring. Methyl mercaptan is evolved. When the evolution of methyl mercaptan has ceased, the melt is cooled and dissolved in caustic soda solution. Some insoluble material is filtered off and the filtrate made acid with acetic acid, heated to boiling and filtered to remove an insoluble by-product. From the liquors a substance crystallises after standing for some hours; this is filtered off and boiled with dilute hydrochloric acid. The solution obtained is cooled and made slightly alkaline with ammonia, brought to boiling and made slightly acid with acetic acid. The precipitate formed is filtered off, washed with hot water, alcohol, and ether and dried. The product is identical with that obtained in Example 3.

*Example 18*

A mixture of 10 parts of the sodium salt of sulphanilamide, 5 parts of 2-(ethylmercapto)-pyrimidine, 10 parts of phenol and 2.5 parts of anhydrous sodium acetate is heated for 10–12 hours at about 170–180° C. while ethyl mercaptan is evolved. After cooling, the residue is dissolved in about 40–50 parts of hot ethyl alcohol and the solution made slightly acid with acetic acid. A precipitate is formed which is filtered off after standing for some hours, washed with a little alcohol, and dried. The dried product is boiled with about five times its weight of water and the water-insoluble product filtered off, washed with hot water and dried. It is 2-(p-amino-benzene-sulphonamido)-pyrimidine.

*Example 19*

A mixture of 8 parts of the sodium salt of sulphanilamide and 5 parts of 2-(ethylmercapto)-6-oxypyrimidine is heated as before. The product is worked up as described in Example 1 and the substance which is finally obtained is identical with the product obtained according to that example.

*Example 20*

A mixture of 10 parts of the sodium salt of sulphanilamide, 5 parts of 2-(ethylmercapto)-4-ethoxy-pyrimidine, 10 parts of phenol, and 2.5 parts of anhydrous sodium acetate is gradually heated up and a temperature of 170–180° C. maintained for about 10 hours. Ethyl mercaptan is evolved during the heating. After cooling the fused mixture is dissolved in hot alcohol and made slightly acid by adding acetic acid. It is cooled and an equal volume of ether is added after standing for some hours. The product which crystallises out is filtered off, washed with alcohol and ether and then boiled with water. The water-insoluble material is filtered off, washed with alcohol and ether and dried. It is 2-(p-amino-benzenesulphonamido)-4-ethoxy-pyrimidine.

*Example 21*

A mixture of 12 parts of the sodium salt of sulphanilamide and 10 parts of 2-(ethylmercapto)-4-methyl-6-oxypyrimidine is heated in the same manner as in Example 3. The product obtained is 2-(p-amino-benzenesulphonamido)-4-methyl-6-oxypyrimidine.

*Example 22*

A mixture of 4 parts of the sodium salt of sulphanilamide, 4 parts of 2-(ethylmercapto)-4-phenyl-6-oxypyrimidine and 5 parts of phenol is heated as described before. After the evolution of ethyl mercaptan has substantially ceased, the fusion is cooled, the solid residue broken up and extracted with methylated spirit, to remove the phenol. The insoluble residue is filtered off, dissolved in hot water and the alkaline solution obtained made slightly acid with acetic acid. A white precipitate is formed which can be further purified by recrystallisation from dilute acetone. It is 2-(p-amino-benzene-sulphonamido)-4-phenyl-6-oxypyrimidine.

*Example 23*

A mixture of 10 parts of the sodium salt of sulphanilamide and 12 parts of 2-(n-propylmercapto)-6-oxypyrimidine is heated as described in Example 1. Propyl mercaptan is evolved. After the evolution of propyl mercaptan has ceased, the product is worked up as described in that example, and the product obtained is 2-(p-amino-benzene-sulphonamido)-6-oxy-pyrimidine, identical with Example 1.

*Example 24*

A mixture of 11 parts of the sodium derivative of p-acetyl amino-benzene-sulphonamide and 8 parts of 2-(n-butylmercapto)-6-oxypyrimidine in 10 parts of phenol is heated as described in Example 2: n-butyl mercaptan is evolved. The reaction mixture is worked up and the product purified exactly as described in Example 2. The product finally obtained is 2-(p-acetyl-amino-benzene sulphonamido)-6-oxypyrimidine which can be hydrolysed as described in Example 2 to 2-(p-amino-benzene-sulphonamido)-6-oxypyrimidine.

*Example 25*

A mixture of 10 parts of the sodium salt of sulphanilamide, and 10 parts of 2-(benzylmercapto)-6-oxypyrimidine is gradually heated up to a final temperature of about 200° C. in the course of three hours. The benzyl mercaptan is then allowed to distil off under reduced pressure. The fused mixture is then cooled down, water added, and the whole warmed up on a water bath, when a slightly turbid alkaline solution is obtained. The solution, after cooling down, is extracted with ether to remove any remaining benzyl mercaptan. The solution, after the extraction is filtered, heated to boiling and made slightly acid with acetic acid. A substance is precipitated, which is then filtered off, washed with hot water, alcohol and ether and dried. This is identical with the product obtained in Example 1.

*Example 26*

A mixture of 11 parts of the sodium salt of sulphanilamide and 9 parts of 2-(methylmercapto)-4:5-di-methyl-6-oxypyrimidine is heated to fusion as described in Example 1, the temperature finally reaching 190–200° C. after three hours. The evolution of methyl mercaptan has then substantially ceased. The solid residue remaining is dissolved in hot water, filtered with the aid of charcoal, the hot filtrate is acidified with a slight excess of acetic acid and a white insoluble product is precipitated. It is filtered off, washed with hot water, alcohol and ether and dried. It is 2-(p-amino - benzene-sulphonamido) -4:5-dimethyl-6-oxypyrimidine.

Example 27

A mixture of 8 parts of the sodium salt of sulphanilamide and 6 parts of 2-(methylmercapto) - 4-amino-6-oxypyrimidine is gradually heated up for three hours. The temperature finally reached is 200–210° C. Methyl mercaptan is evolved and a solid product remains. After cooling, this product is dissolved in hot water, the solution filtered with the aid of charcoal and acidified with acetic acid. The precipitate is filtered off and recrystallised from water. A water-insoluble product remains. This is filtered off, washed with water, alcohol and ether and dried. It is 2-(p-amino-benzene-sulphonamido)-4-amino - 6 - oxypyrimidine.

Example 28

A mixture of 10 parts of the sodium salt of sulphanilamide, 6 parts of 2-(methylmercapto)-6-chloro-pyrimidine, and 10 parts of phenol is heated for 6 hours. Methyl mercaptan is evolved and the temperature finally reaching 180° C. Heating is then stopped, the mixture cooled and boiled with water, and the aqueous solution separated from an insoluble oil. The aqueous liquor is cooled down and a product crystallises out which is filtered off, washed with water and redissolved in it. An insoluble material remains which is filtered off, washed with water and dried. The product is believed to be 2-(p-amino-benzene-sulphonamido)-6-chloro-pyrimidine.

Example 29

A mixture of 20 parts of the sodium salt of sulphanilamide, 20 parts of phenol and 9 parts of 2-(methylmercapto)-4-methyl pyrimidine is heated for 10 hours, the temperature finally reaching 180–185° C. During this time methyl mercaptan is evolved. After cooling down, the melt is treated with about 60 ccs. of alcohol and a dark solution is obtained. 60 cc. of ether is added and the solution made slightly acid by adding acetic acid. It is left standing for some hours when a product crystallises out. This is filtered off and treated with about 100 cc. of boiling water and the material which remains insoluble is filtered off, washed with hot water, alcohol and ether and dried. This is almost pure 2-(p-amino-benzene-sulphonamido)-4-methyl-pyrimidine.

Example 30

A mixture of 7 parts of the sodium salt of sulphanilamide, 5 parts of 2-(methylmercapto)-4-methyl-6-thiopyrimidine, and 5 parts of phenol is brought to fusion, and the temperature maintained for about 3 hours between 170 and 180° C. Methyl mercaptan and a small amount of hydrogen sulphide are evolved. After cooling, the solid residue is dissolved in hot water, some insoluble material is filtered off, and the filtrate is made slightly acid with acetic acid. A resinous product is formed which, after separating the liquors, is treated with alcohol, whereupon it is converted to a fine crystalline mass. It is filtered off, washed with water and alcohol and dried. The product is believed to be 2-(p-amino-benzene-sulphonamido)-4-methyl-6-thiopyrimidine.

Example 31

A mixture of 8 parts of the sodium salt of sulphanilamide, 6 parts of bis-(2-(methylmercapto)-4-methyl-pyrimidine)-6-sulphide and 5 parts of phenol is gradually heated up for four hours to 200° C. Methyl mercaptan is evolved. After the evolution of methyl mercaptan has substantially ceased, the melt is cooled and heated with ethyl alcohol whereupon it becomes crystalline. The crystalline product is filtered off and dissolved in hot water, some insoluble material being filtered off with the aid of charcoal, and the hot filtrate is acidified with acetic acid. A resinous product separates, from which the liquors are separated by decantation. More acetic acid is added to the liquors which are filtered again hot, with the aid of charcoal, and after cooling a white crystalline product is obtained. The product had the expected properties of 2-(p-aminobenzene sulphonamido) - 4 - methyl-pyrimidyl-2'(methylmercapto) - 4' - methyl-pyrimidyl-6:6'-thioether.

Example 32

A mixture of 6 parts of sodium sulphanilamide and 4.3 parts of 2:4-dimethyl-6-(methylmercapto)-pyrimidine, and 5 parts of phenol is gradually heated up to a temperature of about 180–190° C. for 4–5 hours until the evolution of methyl mercaptan has substantially ceased. After cooling the reaction mixture is treated with alcohol, making it slightly acid by the addition of the necessary amount of acetic acid. After leaving the mixture for some hours an insoluble product is filtered off and washed with alcohol. This product is boiled with water, to remove any unchanged sulphanilamide and there remains an insoluble material. It is 2,4-dimethyl-6-(p-amino-benzene-sulphonamido)-pyrimidine.

Example 33

A mixture of 6 parts of the sodium salt of sulphanilamide, 6 parts of 2-(methylmercapto)-5-nitro-pyridine, and 5 parts of phenol is gradually heated up during 4 hours until the temperature reaches 180–190° C. During this time methyl mercaptan is evolved, and the mixture becomes black in colour. After cooling, the solid residue is broken up and extracted with warm alcohol to remove unchanged material. An insoluble product is filtered off, and dissolved in caustic soda solution. The solution is filtered with the aid of charcoal and made slightly acid with dilute hydrochloric acid. A substance is precipitated which is believed to be 2-(p-amino-benzene-sulphonamido-)-5-nitro-pyridine.

Example 34

A mixture of 5 parts of 2-(methylmercapto)-benzthiazole, 7 parts of the sodium salt of sulphanilamide, and 5 parts of phenol is gradually heated up to 200–220° C. in the course of three hours. During this time, methyl mercaptan is evolved. The fusion mixture is cooled and treated with hot water and the solution filtered to remove a slight amount of insoluble material. The filtrate is made neutral with the necessary amount of acetic acid and the precipitate which is formed is filtered off and washed with alcohol. It is then treated with hot water to dissolve unchanged sulphanilamide, the insoluble material remaining. This is filtered off, dissolved in dilute ammonia and the solution filtered with the aid of charcoal. The clear filtrate is made slightly acid with acetic acid and a slightly cream coloured product crystallises out. This is believed to be 2-(p-amino-benzene-sulphonamido)-benzthiazole.

*Example 35*

A mixture of 10 parts of the sodium salt of para-amino-benzene-methyl sulphonamide and 10 parts of 2-(methylmercapto)-6-oxypyrimidine is gradually heated as described in Example 1. Methyl mercaptan is evolved. The reaction mixture is worked up in a similar way to Example 1 and the product which is finally obtained is 2-(p-amino-benzene-sulphonmethylamido)-6-oxypyrimidine.

*Example 36*

A mixture of 12 parts of the sodium salt of p-amino benzene sulphonacetamide and 6 parts of 2-(methylmercapto)-6-oxypyrimidine is gradually heated up during 2.5 to 3 hours to 200–210° C., methyl mercaptan being evolved. After the heating is stopped, the product is dissolved in warm water and the solution which is obtained is filtered. The filtrate is acidified with acetic acid. A resin is precipitated and the liquors are decanted and left standing. From these liquors, a new product precipitates out, which is crystalline. It is filtered off, washed with water, alcohol and ether, and dried. It is 2-(p-amino-benzene-sulphonacetamido)-6-oxypyrimidine. This product is hydrolysed with hydrochloric acid in the same way as described in Example 2 and the product obtained is identical with the hydrolysed product described in Example 2.

*Example 37*

12 parts of the sodium salt of 2-(p-amino-benzene sulphonamido)-thiazole, 6 parts of 2-(methylmercapto)-6-oxypyrimidine, and 10 parts of water are mixed together and gradually heated up to 160–170° C. for about 3–4 hours. In the beginning, water evaporates and later methyl mercaptan is evolved. The remaining solid product is cooled and dissolved in dilute caustic soda solution, filtered with the aid of charcoal, and made strongly acid with hydrochloric acid. A small amount of insoluble material is removed by filtration; the liquors are diluted with water and then ammonia is added until the mixture is no longer acid to Congo red paper. The product is precipitated, filtered off, washed with water and boiled with acetone. Finally, the acetone-insoluble material is filtered off, washed with acetone and ether and dried. The product is believed to be 2-(p-aminobenzenesulphon-(2')-thiazylamido)-6-oxypyrimidine.

What we claim is:

1. A process for the production of a benzene sulphonamide in which the nitrogen atom of the sulphonamide group is directly linked to a nuclear carbon atom of a heterocyclic nucleus containing a nuclear nitrogen atom which comprises heating together at an elevated temperature a benzene sulphonamide containing at least one free hydrogen atom in the sulphonamide grouping and a thioether of the general formula $R^2SR^3$ in which $R^2$ is selected from the group consisting of alkyl and aralkyl hydrocarbon groups and $R^3$ is the above-mentioned heterocyclic nucleus and is selected from the group consisting of a mononuclear heterocyclic group and a mononuclear heterocyclic group fused to a benzene ring, the group $R^3$ being directly linked to the sulphur atom of the thioether through a nuclear carbon atom of the heterocyclic group.

2. A process for the production of a benzene sulphonamide in which the nitrogen atom of the sulphonamide group is directly linked to a nuclear carbon atom of a heterocyclic nucleus containing a nuclear nitrogen atom which comprises heating together at an elevated temperature a benzene sulphonamide having a strong base-forming metal atom directly linked to the nitrogen atom of the sulphonamide group and a thioether of the general formula $R^2SR^3$ in which $R^2$ is selected from the group consisting of alkyl and aralkyl hydrocarbon groups and $R^3$ is the above-mentioned heterocyclic nucleus and is selected from the group consisting of a mononuclear heterocyclic group and a mononuclear heterocyclic group fused to a benzene ring, the group $R^3$ being directly linked to the sulphur atom of the thioether through a nuclear carbon atom of the heterocyclic group.

3. A process for the production of a para-aminobenzene sulphonamide in which the nitrogen atom of the sulphonamide group is directly linked to a nuclear carbon atom of a monocyclic heterocyclic nucleus containing at least one nuclear nitrogen atom which comprises heating together at a temperature of from 140° C. to 210° C. a para-aminobenzene sulphonamide containing at least one free hydrogen atom in the sulphonamide grouping and a C-alkylmercapto monocyclic heterocyclic compound containing at least one nuclear nitrogen atom, the C-alkylmercapto grouping containing not more than six carbon atoms.

4. A process for the production of a para-aminobenzene sulphonamide in which the nitrogen atom of the sulphonamide group is directly linked to a nuclear carbon atom of a monocyclic heterocyclic nucleus containing at least one nuclear nitrogen atom which comprises heating together at a temperature of from 140° C. to 210° C. a para-aminobenzene sulphonamide having a strong base-forming metal atom directly linked to the nitrogen atom of the sulphonamide group and a C-alkylmercapto monocyclic heterocyclic compound containing at least one nuclear nitrogen atom, the C-alkylmercapto grouping containing not more than six carbon atoms.

5. A process for the production of a benzene sulphonamido pyrimidine which comprises heating together at an elevated temperature a benzene sulphonamide containing at least one free hydrogen atom in the sulphonamide group and a C-alkylmercapto pyrimidine containing not more than six carbon atoms in the alkyl group whereby alkyl mercaptan is evolved and continuing said heating until evolution of alkyl mercaptan has substantially ceased.

6. A process for the production of a benzene sulphonamido pyrimidine which comprises heating together at an elevated temperature, a benzene sulphonamide having a strong base-forming metal atom directly linked to the nitrogen atom of the sulphonamide grouping and a C-alkylmercapto pyrimidine containing not more than six carbon atoms in the alkyl group whereby alkyl mercaptan is evolved and continuing said heating until evolution of alkyl mercaptan has substantially ceased.

7. A process for the production of a benzene sulphonamido thiazole which comprises heating together at an elevated temperature a benzene sulphonamide containing at least one free hydrogen atom in the sulphonamide group and a C-alkylmercapto thiazole containing not more than six carbon atoms in the alkyl group whereby alkyl mercaptan is evolved and continuing said heating until evolution of alkyl mercaptan has substantially ceased.

8. A process for the production of a benzene sulphonamido thiazole which comprises heating together at an elevated temperature, a benzene sulphonamide having a strong base-forming metal atom directly linked to the nitrogen atom of the sulphonamide grouping and a C-alkylmercapto thiazole containing not more than six carbon atoms in the alkyl group whereby alkyl mercaptan is evolved and continuing said heating until evolution of alkyl mercaptan has substantially ceased.

9. A process for the production of a benzene sulphonamido pyridine which comprises heating together at an elevated temperature a benzene sulphonamide containing at least one free hydrogen atom in the sulphonamide group and a C-alkylmercapto pyridine containing not more than six carbon atoms in the alkyl group whereby alkyl mercaptan is evolved and continuing said heating until evolution of alkyl mercaptan has substantially ceased.

10. A process for the production of a benzene sulphonamido pyridine which comprises heating together at an elevated temperature, a benzene sulphonamide having a strong base-forming metal atom directly linked to the nitrogen atom of the sulphonamide grouping and a C-alkylmercapto pyridine containing not more than six carbon atoms in the alkyl group whereby alkyl mercaptan is evolved and continuing said heating until evolution of alkyl mercaptan has substantially ceased.

SIEGFRIED PICKHOLZ.
HAYDN GEOFFREY DICKENSON.

REFERENCES CITED

The following references are of record in the file of this patent:

UNITED STATES PATENTS

| Number | Name | Date |
|---|---|---|
| 2,293,811 | Ewins et al. | Aug. 25, 1942 |
| 2,300,676 | Karasch et al. | Nov. 3, 1942 |
| 2,335,653 | Dean | Jan. 30, 1943 |

Certificate of Correction

Patent No. 2,471,772.   May 31, 1949.

SIEGFRIED PICKHOLZ ET AL.

It is hereby certified that the name of the assignee in the above numbered patent was erroneously described and specified as "Ward, Bienkinsop & Company Limited" whereas said name should have been described and specified as *Ward, Blenkinsop & Company Limited*, as shown by the record of assignments in this Office; column 3, line 66, for the word "derivatives" read *derivative;* column 4, line 26, for "2-ethylmer-" read *2-(ethylmer-;* and that the said Letters Patent should be read with these corrections therein that the same may conform to the record of the case in the Patent Office.

Signed and sealed this 25th day of October, A. D. 1949.

[SEAL]

THOMAS F. MURPHY,
*Assistant Commissioner of Patents.*